Sept. 27, 1955  A. M. LEWIS ET AL  2,719,211
FOOD STEAMER
Filed Feb. 25, 1954  5 Sheets-Sheet 1
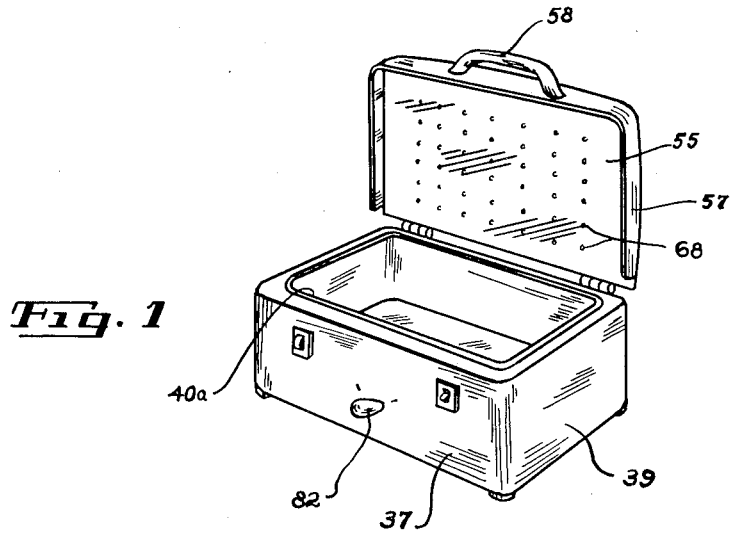
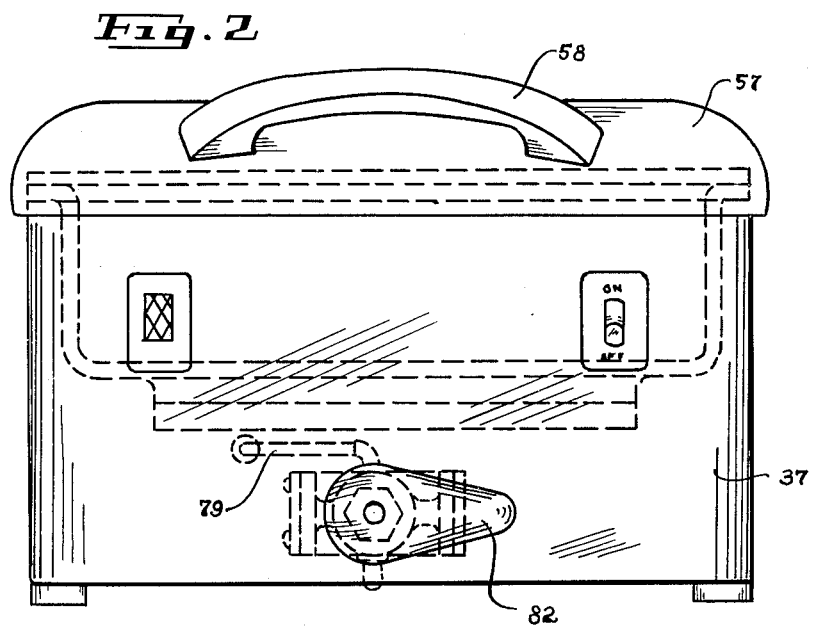
INVENTOR.
ALBERT M. LEWIS
ALBERT M. ELIAS
BY Thos. Donnelly
ATTORNEY INVENTOR.
ALBERT M. LEWIS
ALBERT M. ELIAS
BY Thos S Donnelly
ATTORNEY

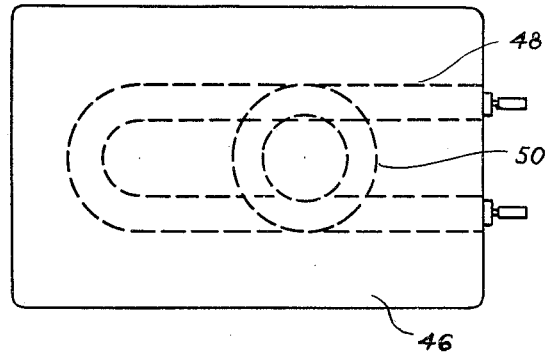
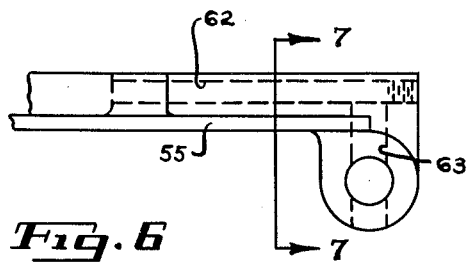
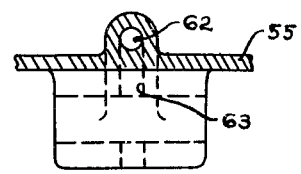
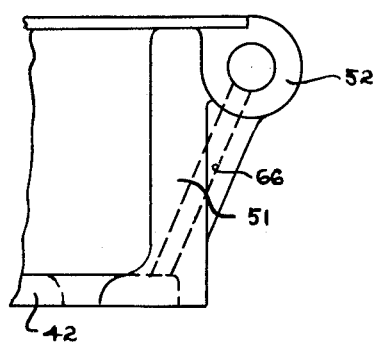
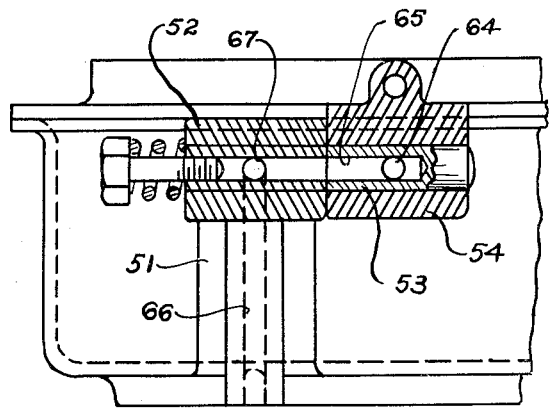
INVENTOR.
ALBERT M. LEWIS
ALBERT M. ELIAS
BY Thos. Donnelly
ATTORNEY Sept. 27, 1955 A. M. LEWIS ET AL 2,719,211
FOOD STEAMER
Filed Feb. 25, 1954 5 Sheets-Sheet 4
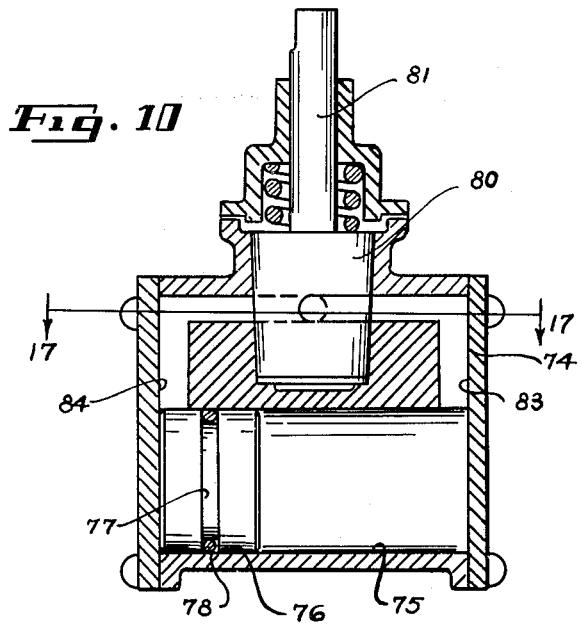
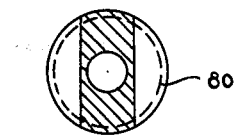
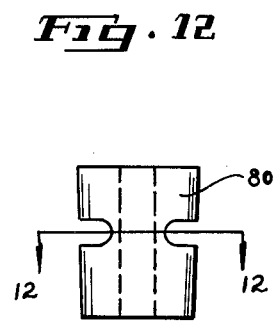
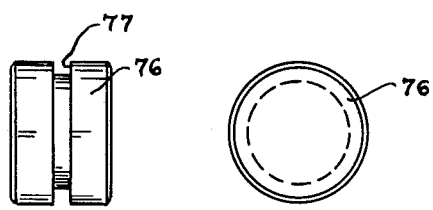
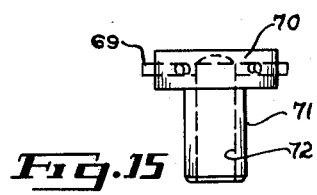
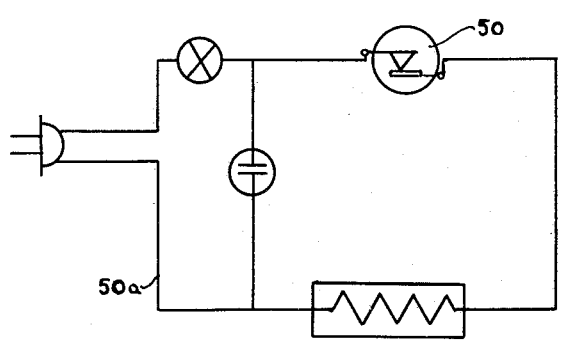
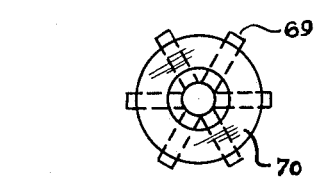
*INVENTOR.*
ALBERT M. LEWIS
ALBERT M. ELIAS
BY
*ATTORNEY*

INVENTOR.
ALBERT M. LEWIS
ALBERT M. ELIAS
BY
ATTORNEY

United States Patent Office 2,719,211
Patented Sept. 27, 1955

2,719,211
FOOD STEAMER
Albert M. Lewis, Grosse Pointe Woods, and
Albert M. Elias, Detroit, Mich.
Application February 25, 1954, Serial No. 412,532
6 Claims. (Cl. 219—38)

Our invention relates to a new and useful improvement in a food steamer adapted for use in steaming foods such as buns, bread, cake and the like, for the purpose of freshening the same, and also adapted for heating other food products to a desired temperature. An example of the other food products which may be easily and quickly heated to the desired temperature are wieners and soup.

It is an object of the present invention to provide a food steamer of this class which will be simple in structure, economical to manufacture, durable, compact, highly efficient in use and easily and quickly operated.

Another object is the provision in a food steamer of this class of a liquid receiving compartment heated to a temperature so that liquid delivered thereto will be instantly turned into steam, and provided with a mechanism whereby such compartment may be connected to a supply of water under pressure and a pre-determined amount admitted to said chamber when desired.

Another object of the invention is the provision in a food steamer of this class of a movable cover having a steam receiving compartment from which the steam may pass into the food containing compartment.

Another object of this invention is the provision of a movable piston, movable by the water pressure for delivering into the liquid receiving compartment a predetermined amount of liquid, and having a control whereby the movement of the piston and the direction of movement may be controlled.

Other objects will appear hereinafter.

It is recognized that various modifications and changes may be made in the detail of the structure illustrated without departing from the invention, and it is intended that the present disclosure shall be considered to be but the preferred embodiment.

Forming a part of this application are drawings in which,

Fig. 1 is a perspective view of the invention showing the cover in open position.

Fig. 2 is a front elevational view of the invention.

Fig. 5 is a plan view of the heating element plate used in the invention.

Fig. 6 is a fragmentary side view of a cover plate used in the invention.

Fig. 7 is a sectional view taken on line 7—7 of Fig. 6.

Fig. 8 is a fragmentary side elevational view of the compartment forming structure.

Fig. 9 is a fragmentary sectional view taken on line 9—9 of Fig. 4.

Fig. 10 is a central sectional view slightly enlarged of the valve mechanism used in the invention.

Fig. 11 is a side elevational view of a valve plug used in the invention.

Fig. 12 is a sectional view taken on line 12—12 of Fig. 11.

Fig. 13 is a side elevational view of a piston used in the invention.

Fig. 14 is an end elevational view of a piston used in the invention.

Fig. 15 is a side elevational view of a distributing nozzle used in the invention.

Fig. 16 is a top plan view of the distributing nozzle used in the invention.

Fig. 19 is a diagrammatic view of the wiring used in the invention.

Figure 3:
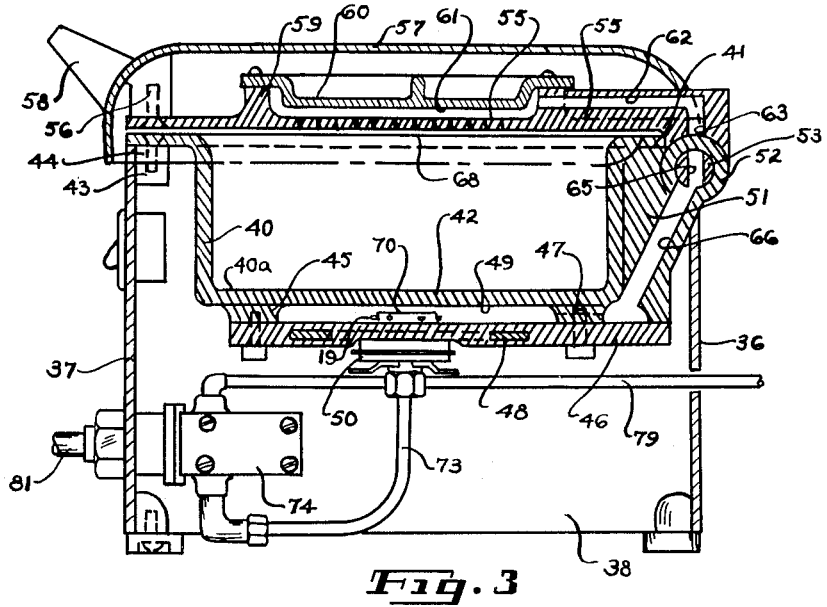
Fig. 3 is a longitudinal central vertical sectional view of the invention.
Figure 4:
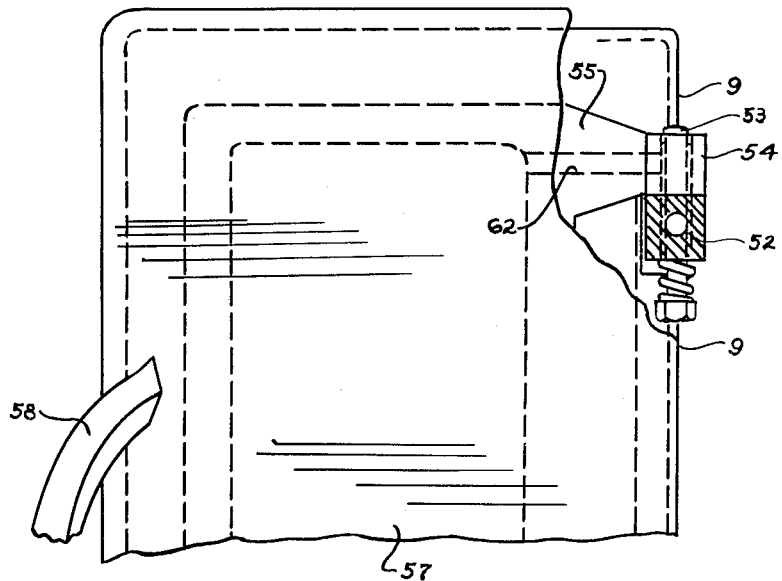
Fig. 4 is a fragmentary top plan view of the invention with parts broken away and parts shown in section.

As shown in the drawings, the invention comprises a housing or casing having a rear wall 36, a front wall 37 and side walls 38 and 39. A food container 40 having a compartment 40a is provided with the outwardly projecting flange 41 which rests upon and is secured to the supporting rib 43 mounted on the casing walls, screws 44 serving to secure the flange 41 to the rib 43. Projecting downwardly from the bottom 42 of this member 40 is a circular rib 45 which is engaged at its lower face with the upper face of a plate 46 which is secured thereto by the screws 47 so that there is formed between the bottom of the plate 42 and the top of the plate 46 a liquid receiving compartment 49.

Positioned in the plate 46 is an electric heating element 48 which may be connected to a suitable source of electrical energy. Interposed in the electric circuit of the heating element 48 is a thermostat 50 which is positioned, as shown in Fig. 3, below the plate 46. The chamber 49 is maintained at a high temperature, and experience has shown that a temperature of 330° or higher is desirable. This temperature must be of such a degree that when liquid is delivered into the compartment 49, it will be instantly turned into steam. It is preferable that the temperature be such also that the steam will be immediately superheated.

Formed on one of the side walls of the member 40 is a pair of bosses 51, on the upper end of which is formed a knuckle 52 in which engages a hollow pintle 53 which also projects into a knuckle 54 formed on the cover. This knuckle 54 is formed on the plate 55 secured to which by means of screws 56 is a casing 57 carrying the handle 58. A ring 59 projects upwardly from the upper face of the plate 55 and serves as a support for the plate 60 which is secured thereto in spaced relation to provide the steam receiving compartment 61. A passage 62 is formed in the plate 55 communicating with the passage 63 which leads into the knuckle 54 and communicates through the opening 64 with the interior 65 of the pintle 53. Formed in the boss 51 is a passage 66 which communicates with the chamber 49 and also communicates with the interior 65 of the pintle through the opening 67. Formed in the plate 55 are small openings 68 which lead from the steam receiving compartment 61 to the food receiving compartment 40a.

The construction is such that when water is delivered into the compartment 49 it is instantly converted into super heated steam which passes through the opening 68 into the compartment 40a. The liquid is delivered into the compartment 49 as a very fine spray through the outlet tubes 69 which radiate outwardly from the nozzle head 70. This nozzle head 70 is mounted in the compartment 49 and projecting through the plate 46 is the nozzle stem 71 having a passage 72 formed therein in communication with the liquid delivery pipe 73. This pipe leads from the housing 74 in which is formed the cylinder 75. Slideable in this cylinder 75 is a piston 76 having the peripheral groove 77 in which is positioned the sealing ring 78. A supply pipe 79 is connected to a source of water under pressure, preferably the city supply system. This supply pipe communicates with the cylinder 75 through a control valve embodying a valve plug 80 rotatable by the stem 81 on which is mounted a handle 82 as shown in Fig. 2.

In this housing 74 is formed a passage 83 for establishing communication through the valve plug 80 of the supply pipe 79 with one side of the cylinder 75. A similar passage 84 is formed in the housing 74 for establishing communication of the supply line 79 through the valve plug 80 with the opposite side of the cylinder 75. In the form shown in Fig. 10, the supply line 79 is in communication with the passage 83 and the passage 84 is cut off from the supply line. However, the passage 84 is in communication with the delivery pipe 73. When the valve plug is rotated so as to cut off the passage 83 from communication with the supply line, the passage 83 would then be brought into communication with the delivery pipe 73 and the passage 84 would be brought into communication with the supply line 79. When the passage 84 is brought into communication with the supply line, the liquid passing downwardly in the passage 84 will force the piston 76 to the right of Fig. 10 thus forcing the liquid contained in the cylinder 75 outwardly through the passage 83 and the delivery pipe 73 into the liquid receiving compartment 49. Thus a predetermined quantity of liquid will be delivered into the liquid receiving compartment 49 so that a predetermined amount of steam will be generated in the chamber 49. When the valve plug is rotated in the opposite direction, the piston 76 would, of course, move from the right of Fig. 10 into the position shown in Fig. 10 so that the piston serves to eject a predetermined amount of liquid at each sliding movement.

Figure 18:
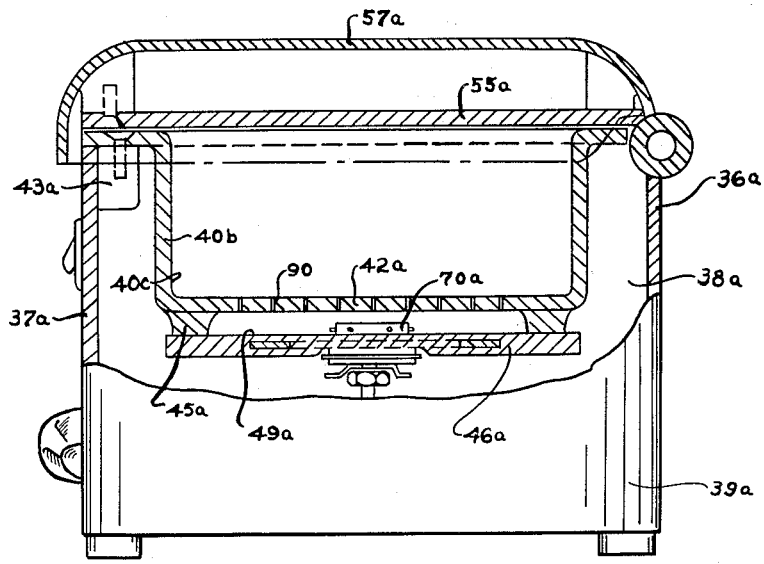
Fig. 18 is a view similar to Fig. 3 showing a modification.
Figure 17:
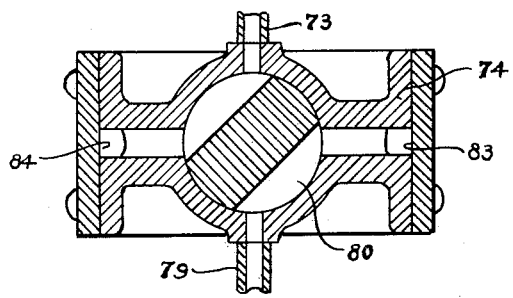
Fig. 17 is a sectional view taken on line 17—17 of Fig. 10.

In the modified form shown in Fig. 18, the casing having the rear wall 36a—the front wall 37a—and the side walls 38a and 39a—corresponds to the casing shown in Fig. 1. The plates 42a and 46a are held apart by the ring 45a so as to provide the chamber 49a into which liquid is delivered through the nozzle head 70a. The bottom 42a of the food receiving container 40b is provided with perforations 90 so that the steam generated in chamber 49a will pass directly through the openings 90 into the compartment 40c in which the food is disposed. The cover 55a is provided with the casing 57a so that these structures are the same as shown in the preferred form excepting that the steam enters the food receiving compartment 40c from below instead of from above.

What we claim is:

1. A device of the class described, comprising: a compartment for the reception of articles; a steam generating compartment; an electric heating element for heating liquid delivered to the said steam generating compartment, the steam generating compartment being in communication with said article receiving compartment; a conduit communicating with said steam generating compartment for delivering liquid thereinto; a valve housing, said conduit being in communication with said valve housing; a pipe for connecting said valve housing to a source of liquid under pressure through said valve; a cylinder in said housing; a piston slidable in said cylinder and moveable to one side of said cylinder upon movement of said valve to one position, said side of said cylinder being in communication with said conduit and the opposite side of said cylinder being in communication with said pipe, the movement of said valve to another position reversing the communications of said cylinder with said pipe and said conduit.

2. A device of the class described, comprising: a compartment for the reception of articles; a steam generating compartment in communication with said first named compartment; a heating element for heating liquid delivered to said steam generating compartment; a conduit for delivering liquid into said steam generating compartment; a valve housing; a valve in said housing, said conduit being in communication with said housing through said valve; a cylinder in said housing; a pipe connected to said housing and to a source of liquid pressure for delivering liquid through said valve into one end or the other of said cylinder; a piston slidable in said cylinder from end to end thereof, the movement of said valve to one position establishing communication of one end of said cylinder with said pipe and the opposite end of said cylinder with said conduit for effecting a movement of said piston from one end of said cylinder to the other for forcing through said conduit a quantity of liquid contained in said cylinder.

3. In a device of the class described, a compartment for the reception of articles; a steam generating compartment in communication with said first named compartment; a heating element for heating liquid delivered to said steam generating compartment; a valve housing; a valve in said housing, said conduit being in communication with said housing through said valve; a cylinder in said housing; a pipe connected to said housing and to a source of liquid pressure for delivering liquid through said valve into one end or the other of said cylinder; a piston slidable in said cylinder from end to end thereof, the movement of said valve to one position establishing communication of one end of said cylinder with said pipe and the opposite end of said cylinder with said conduit for effecting a movement of said piston from one end of said cylinder to the other for forcing through said conduit a quantity of liquid contained in said cylinder, the movement of said valve to another position establishing communication of said one end of said cylinder with said conduit and said opposite end of said cylinder with said pipe for reversing direction of movement in said piston in said cylinder.

4. In a device of the class described, a steam generating compartment; a conduit for conducting liquid into said compartment; a valve housing; a valve in said housing; a cylinder in said housing; said conduit being connected to both ends of said cylinder by a pair of passages in said housing; a piston slidably mounted in said cylinder; a pipe connected to said passages for conducting liquid under pressure into said cylinder, the movement of said valve to one position establishing communication of said conduit with one end of said cylinder through one of said passages, and of said pipe with the opposite end of said cylinder through the other of said passages, and upon movement to another position reversing the ends of communication of said pipe and said conduit with said passages and cylinder.

5. In a device of the class described, a steam generating compartment; a conduit for conducting liquid into said compartment; a valve housing; a valve in said housing; a cylinder in said housing; a piston slidably mounted in said cylinder; a pipe for conducting liquid under pressure into said cylinder, the movement of said valve to one position establishing communication of said conduit with one end of said cylinder and of said pipe with the opposite end of said cylinder and upon movement to another position reversing the ends of communication of said pipe and said conduit with said cylinder; a compartment for the reception of articles, said compartment being in communication with said steam generating compartment.

6. In a device of the class described, a steam generating compartment; a conduit for conducting liquid into said compartment; a valve housing; a valve in said housing; a cylinder in said housing; a piston slidably mounted in said cylinder; a pipe for conducting liquid under pressure into said cylinder, the movement of said valve to one position establishing communication of said conduit with one end of said cylinder and of said pipe with the opposite end of said cylinder and upon movement to another position reversing the ends of communication of said pipe and said conduit with said cylinder; a compartment for the reception of articles; a steam receiving compartment in communication with said steam generating compartment and said article receiving compartment.

References Cited in the file of this patent

UNITED STATES PATENTS

| | | |
|---|---|---|
| 1,946,573 | Devries | Feb. 13, 1934 |
| 2,109,326 | Tricomi et al. | Feb. 22, 1938 |
| 2,674,935 | Lewis et al. | Apr. 13, 1954 |